United States Patent
Levenson et al.

(10) Patent No.: US 6,791,945 B1
(45) Date of Patent: Sep. 14, 2004

(54) TIME OUT THRESHOLD SHAPING FOR WIRELESS TCP COMMUNICATIONS

(75) Inventors: Samuel M. Levenson, Arlington Heights, IL (US); Yutal T. Koh, Southlake, TX (US); Mark S. Hansen, Colleyville, TX (US)

(73) Assignee: Motorola, Inc., Schaumburg, IL (US)

( * ) Notice: Subject to any disclaimer, the term of this patent is extended or adjusted under 35 U.S.C. 154(b) by 9 days.

(21) Appl. No.: 09/662,859

(22) Filed: Sep. 15, 2000

(51) Int. Cl.[7] .......................... H04L 12/26; H04Q 7/24
(52) U.S. Cl. .................. 370/235; 370/252; 370/338
(58) Field of Search ............................. 370/235, 252, 370/338, 510

(56) References Cited

U.S. PATENT DOCUMENTS 6,118,765 A * 9/2000 Phillips ...................... 370/235
6,529,527 B1 * 3/2003 Chen et al. .................. 370/510

* cited by examiner

*Primary Examiner*—Steven Nguyen
(74) *Attorney, Agent, or Firm*—L. Bruce Terry

(57) ABSTRACT

The present invention is for shaping a packet time out threshold in a wireless telecommunications network including a TCP session. First, a TCP communications session (18) is identified during which first and second communications nodes (12, 14) communicate with one another by transmitting and receiving data packets across first and second channels (22, 24) of a wireless network (16). Next, a processor (26) located either in one of the communications nodes (12, 14) or in a network base station subsystem (20) determines delay characteristics of each of first and second channels (22, 24) of the communications session. Once the delay characteristics are determined, the processor (20) causes a delay packet to be transmitted on a slower of the first and second channels (22, 24) at predetermined intervals to increase an average time delay associated with both the first and second channels (22, 24). Consequently, the number of unnecessary packet time outs on the first and second channels (22, 24) is minimized.

19 Claims, 2 Drawing Sheets

TIME OUT THRESHOLD SHAPING FOR WIRELESS TCP COMMUNICATIONS

BACKGROUND OF THE INVENTION

1. Field of the Invention

The present invention relates generally to telecommunications networks, and more particularly to the shaping of round trip time delay network packet transmission characteristics to reduce the number of packet time outs occurring during established sessions.

2. Description of Related Art

In conventional telecommunications or data communications networks, communicating nodes establish end-to-end sessions utilizing protocols such as TCP. When a source node transmits a packet to a destination node, it also sets a timer to open an acknowledgement period, based on a TCP-specific algorithm for packet traffic characteristics, during which the destination node must acknowledge correct receipt of the packet. If the source node does not receive an acknowledgement from the destination node before the timer expires, the timer issues a time out, the packet is determined to be lost, and the source node must retransmit the packet to the destination node.

For transmission of TCP packets over a wireless network such as a code division multiple access cdma2000 network, packets exchanged during a TCP session may be transmitted over different physical channels over the wireless link. Packets transmitted over these channels may experience widely varying delays. In the case of a cdma2000 network, the transmission time delay characteristics of the two physical channels available may be an order of magnitude apart (typically tens of milliseconds versus hundreds of milliseconds). Generally, longer packets may be transmitted over the slower channel, while shorter packets, such as packets containing only acknowledgements, may be transmitted over the faster channel, which is the channel that has a smaller capacity per frame. As the above-mentioned TCP-specific algorithm bases the timer acknowledgement period on packet traffic characteristics, if a string of shorter packets is transmitted over the second channel, the time out value generated by the TCP-specific algorithm will be progressively reduced to the point that the transmission of one longer packet on the first channel will cause a time out and therefore cause the longer packet to be re-transmitted. In addition to re-transmitting the packet, the source node may also erroneously determine that the time out was due to network congestion and therefore may reduce the rate of transmission of outgoing packets, thereby further reducing throughput and causing inefficient utilization of the wireless network.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
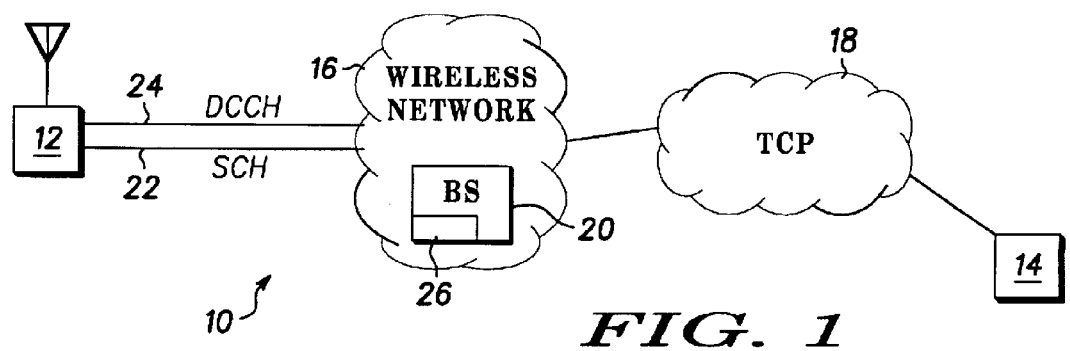
FIG. 1 is a block diagram of a wireless telecommunications system of the type in which round trip time delay shaping in accordance with the present invention is implemented.

Referring now to the drawings in which like numerals reference like parts, FIG. 1 shows a telecommunications network 10 including a source communications node 12 communicating with a destination communications node 14. According to a preferred embodiment, the source communication node 12 is a wireless device, such as a cellular telephone, and the destination communications node 14 is a wireline device, such as a landline server, or a wireless device such as a cellular phone, radio, or any other device capable of communicating over a wireless network 16 through an established protocol, which, according to a preferred embodiment, is cdma2000.

The source and destination nodes 12, 14 communicate with one another by transmitting packets across the wireless network 16 during an established TCP communications link, or session, represented generally at 18. The wireless network 16, which may be capable of supporting either second or third generation air interfaces, includes conventional infrastructure, such as a base station subsystem 20 including base stations and base station controllers, necessary to facilitate wireless transmission of TCP data packets between nodes such as the source and destination nodes 12, 14. In accordance with cdma2000 protocol, TCF packets within the TCP session 18 established between the source and destination nodes 12, 14 may be transmitted between the nodes and across the wireless network 16 over different physical channels, such as a supplementary channel (SCH) SCH 22 and a dedicated control channel (DCCH) 24. Typically, longer packets are scheduled on the SCH 22 and have an associated delay in the hundreds of milliseconds, while shorter packets are scheduled on the DCCH 24 and have an associated delay in the tens of milliseconds. However, more channels having different associated delay times may also be utilized with protocols other than cdma2000.

According to the present invention, a processor 26 such as the one shown in the base station subsystem 20 is programmed with a known time-specific algorithm that provides an acknowledgement period of predetermined length for each packet transmitted by the source node 12. If the destination node 14 sends an acknowledgement indicating that it has received a corresponding packet from the source node 12, the source node 12 determines that the destination node correctly received the packet in question. If the destination node 14 does not send the acknowledgement within the allotted acknowledgement period, the source node 12 determines that the packet is lost or that the destination node 14 did not correctly receive the packet and therefore retransmits the packet.

Because the system 10 includes multiple channels such as the SCH and DCCH channels 22, 24, delay characteristics for each of the channels may vary. The processor 26, however, only keeps a running average of the overall system delay characteristics without differentiating between delays on the SCH 22 and delays on the DCCH 24.

Figure 2:
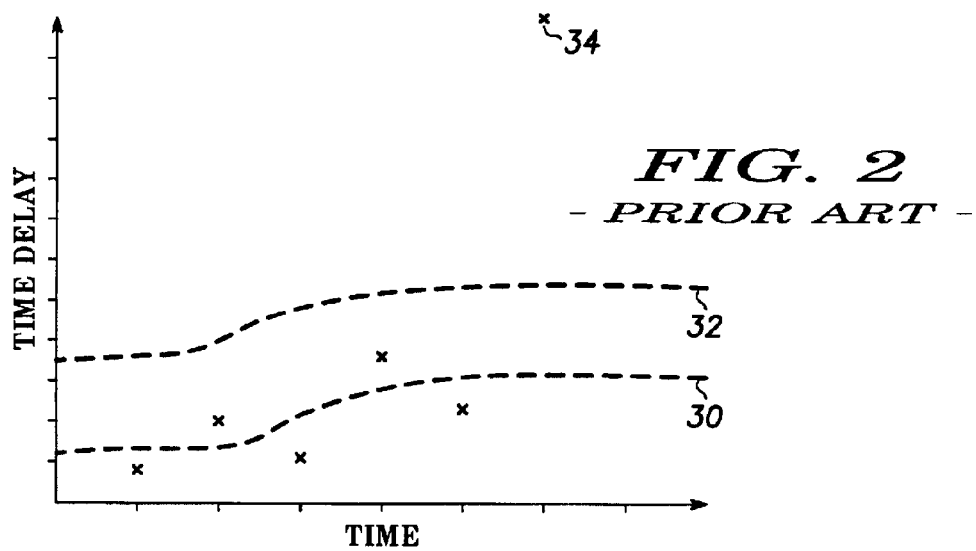
FIG. 2 is a graph of time delays associated with packets transmitted from a source node in a prior art TCP communications system.

As shown in FIG. 2, a prior art processor programmed in a conventional manner maintains a running average 30 of the time delays associated with packets transmitted on both the SCH 22 and the DCCH 24. As shown in FIG. 2, a majority of the packets transmitted during the illustrated time period are shorter packets transmitted on the DCCH 24 having shorter associated round trip delays, which is defined as the time measured from transmission of the packet from the source node 12 to receipt of an acknowledgement at the source node 12 from the destination node 14. The prior art processor then calculates a time out threshold 32 having a value that is set above a running average 30 as calculated by conventional TCP/IP compatible algorithms. The prior art processor then calculates a time out threshold having a value that is set above the running average 30 by an amount determined by conventional currently accepted or deployed algorithms of round-trip time estimation. Consequently, a longer, slower packet transmitted on the SCH 22 and having an associated round trip delay represented graphically at 34 that is significantly above that of the numerous shorter packets transmitted on the DCCH 24, typically by a magnitude of 10×, will be timed out, as its time delay is above the time out threshold 32. The slower packet will be timed out even though the destination node correctly receives the packet. As a result, network capacity is underutilized.

Figure 3:
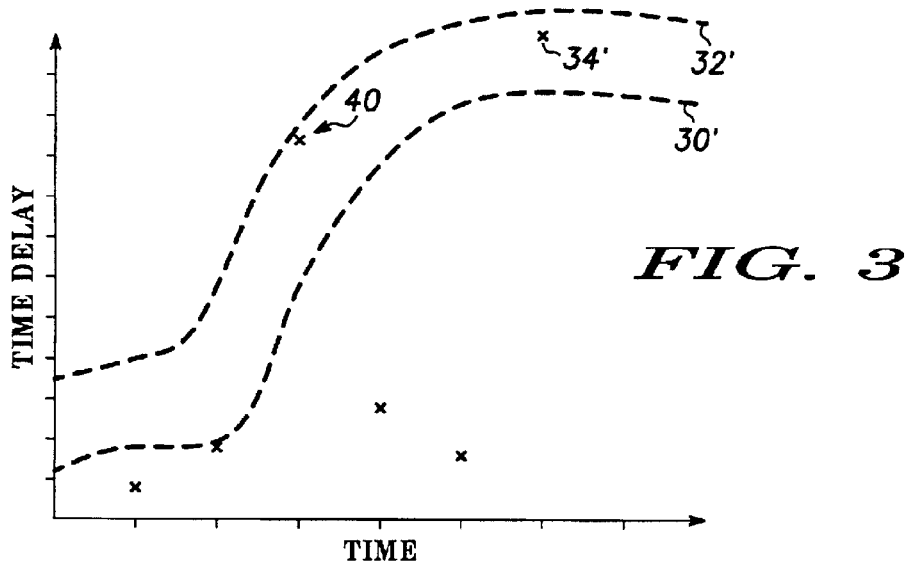
FIG. 3 is a graph of time delays associated with packets transmitted from a source node in a TCP communications system utilizing round trip time delay shaping in accordance with the preferred embodiment of the present invention.

The shaping of round trip time delay network packet transmission characteristics according to the present invention minimizes the occurrence of such unnecessary time outs by automatically increasing the computed running average 30. Specifically, as shown in FIG. 3, the processor 26 executes the above-mentioned time-specific algorithm to compute a running time delay average 30' and a corresponding time out threshold 32' having a value that is set above the running average 30' by a predetermined amount. The processor 26 is also programmed with an algorithm to automatically insert a longer, slower insert packet as illustrated at 40 among the packets being transmitted by the source node 12. Preferably, this slow packet insert algorithm is generated from existing TCP timer adaptation algorithms programmed into the processor, and is tailored so as not to significantly impact system end-to-end performance.

The slow packet insert algorithm causes one insert packet, such as the packet 40, to be inserted on the SCH channel 22 for every X packets that are transmitted by the source node, with X being determined based specific system parameters. The longer insert packet consequently increases the running average 30', and therefore the time out threshold 32', computed by the time-specific algorithm above the running average 30 and time out threshold 32 shown in FIG. 2 that otherwise would have been computed if the longer insert packet 40 was not inserted.

It should be noted that, because the above-discussed TCP sessions are connection-oriented and must be set up when communication is established between the communications nodes 12, 14 and then torn down when the communication is completed, the running average 30', and therefore the time out threshold 32', computed by the time-specific algorithm must be computed on a session-by-session basis in the preferred embodiment.

Figure 4:
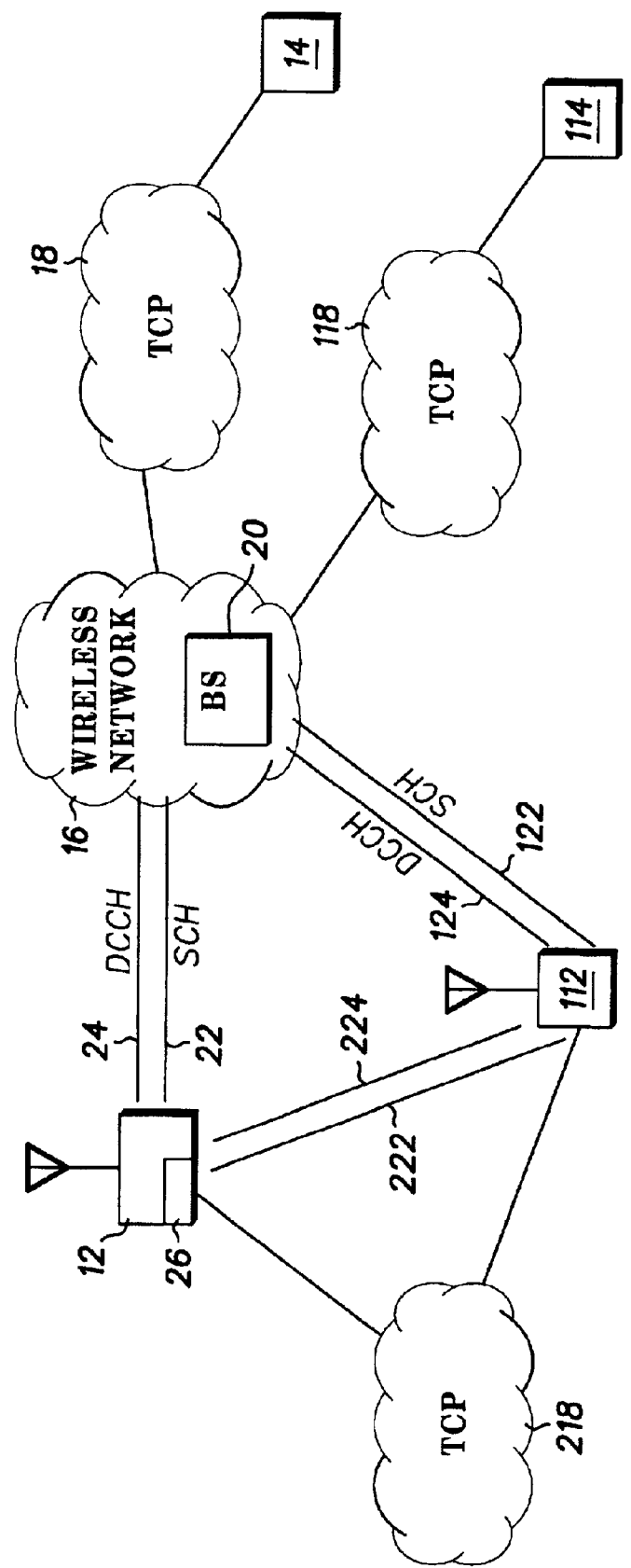
FIG. 4 is a block diagram of an alternative wireless telecommunications system of the type in which round trip time delay shaping in accordance with the present invention is implemented.

While the processor 26, in which the round trip packet delay shaper of the present invention has been discussed as being implemented in the base station subsystem 20, the processor 26 may alternatively be implemented in the source communications node 12 as shown in the system 50 in FIG. 4 or, alternatively, in the destination communications node 14.

In addition, it should be appreciated that the shaping of round trip time delay network packet transmission characteristics according to the present invention may be performed for numerous sets of communications nodes that have established TCP communications sessions through the wireless network, as exemplified by the additional communications nodes 112, 114 communicating with one another or with the nodes 12, 14 by transmitting packets across channels 22, 24, 122, 124 or 222, 224 over the wireless network 16 during established TCP sessions represented generally at 18, 118, 218.

In view of the foregoing discussion, it should now be appreciated that the present invention enables maximum utilization of second and third generation CDMA wireless networks by minimizing the number of packets that must be re-transmitted due to unnecessary time-outs. Consequently, the present invention enhances TCP communications on wireless links to achieve greater service transparency as system users move among wireless and wireline environments. Such connectivity will be required by communications nodes in third generation networks that will eventually replace the traditional voice dominated second-generation networks.

While the above description is of the preferred embodiment of the present invention, it should be appreciated that the invention may be modified, altered, or varied without deviating from the scope and fair meaning of the following claims.

What is claimed is:

1. A telecommunications system, comprising:
   a wireless network;
   first and second communications nodes for establishing a TCP communications session over the wireless network and for communicating with one another during the TCP communications session by transmitting and receiving data packets across first and second network channels;
   the wireless network further including a delay determination node for determining delay characteristics of each of the first and second channels and for causing an insert packet to be transmitted on a slower of the first and second channels at predetermined intervals to increase an average time delay associated with both the first and second channels and to thereby minimize a number of packet time outs on the first and second channels.

2. The telecommunications system of claim 1, wherein the delay determination node comprises a network base station subsystem.

3. The telecommunications system of claim 1, wherein the first node comprises a wireless communications device and the second node comprises one of a wireless and a wireline communications device, and wherein the delay determination node comprises at least one of the first and second subscriber communications units.

4. The telecommunications system of claim 1, wherein the delay determination node is further for being set up on a session-by-session basis.

5. The telecommunications system of claim 1, further comprising multiple sets of first and second communications nodes and multiple sets of first and second network channels for establishing respective communications sessions and for communicating with one another during the respective communications sessions by transmitting and receiving data packets across the multiple sets of first and second network channels.

6. The telecommunications system of claim 1, wherein the delay determination node is further for generating a running packet delay average and a corresponding time out threshold during the communications session, the delay determination node thereby inserting the insert packet into the running average to increase the running average and the delay determination threshold based on the delay characteristics of each of the first and second channels.

7. The telecommunications system of claim 1, wherein the wireless network comprises a cdma2000 network.

8. A method for shaping a time out threshold of a wireless telecommunications network, comprising:

identifying a TCP communications session during which first and second communications nodes communicate with one another by transmitting and receiving data packets across first and second network channels;

determining delay characteristics of each of the first and second network channels of the TCP communications session; and causing an insert packet to be transmitted on a slower of the first and second network channels at predetermined intervals to increase an average time delay and therefore a time out threshold associated with both the first and second network channels and to thereby minimize packet time outs on the first and second network channels.

9. The method of claim 8, wherein the determining of delay characteristics and the causing of a delay packet to be transmitted are performed by a network base station subsystem.

10. The method of claim 8, wherein the determining of delay characteristics and the causing of a delay packet to be transmitted are performed by one of the first and second communications nodes.

11. The method of claim 8, further comprising performing the determining of delay characteristics and the causing of a delay packet to be transmitted on a session-by-session basis.

12. The method of claim 8, further comprising simultaneously performing the determining of delay characteristics and the causing of a delay packet to be transmitted for multiple sets of first and second communications nodes.

13. The method of claim 8, further comprising:

generating the average time delay during the identified TCP communications session; and transmitting the insert packet to increase the average time delay and therefore the time out threshold based on the delay characteristics of the first and second channels.

14. The method of claim 8, wherein the identifying of a TCP communications session comprises identifying a TCP communications session in a cdma2000 network.

15. A processor for shaping a packet time out threshold for a telecommunications network by identifying a TCP communications session during which first and second communications nodes communicate with one another by transmitting and receiving data packets across first and second network channels, by determining delay characteristics of each of the first and second network channels of the communications session, and by causing an insert packet to be transmitted on a slower of the first and second network channels at predetermined intervals to increase an average time delay associated with both the first and second network channels and to thereby minimize a number of packet time outs on the first and second network channels.

16. The processor of claim 15, wherein the processor is located in a network base station subsystem.

17. The processor of claim 15, wherein the processor is located in one of the first and second communications nodes.

18. The processor of claim 15, wherein the processor is for use in a cdma2000 network.

19. The processor of claim 15, wherein the processor is further for computing a time out threshold based on the average time delay.

* * * * *